Sept. 21, 1937.   C. A. CAMPBELL   2,093,513
METHOD OF GROOVING PIPE FITTINGS AND THE LIKE
Filed Jan. 16, 1936
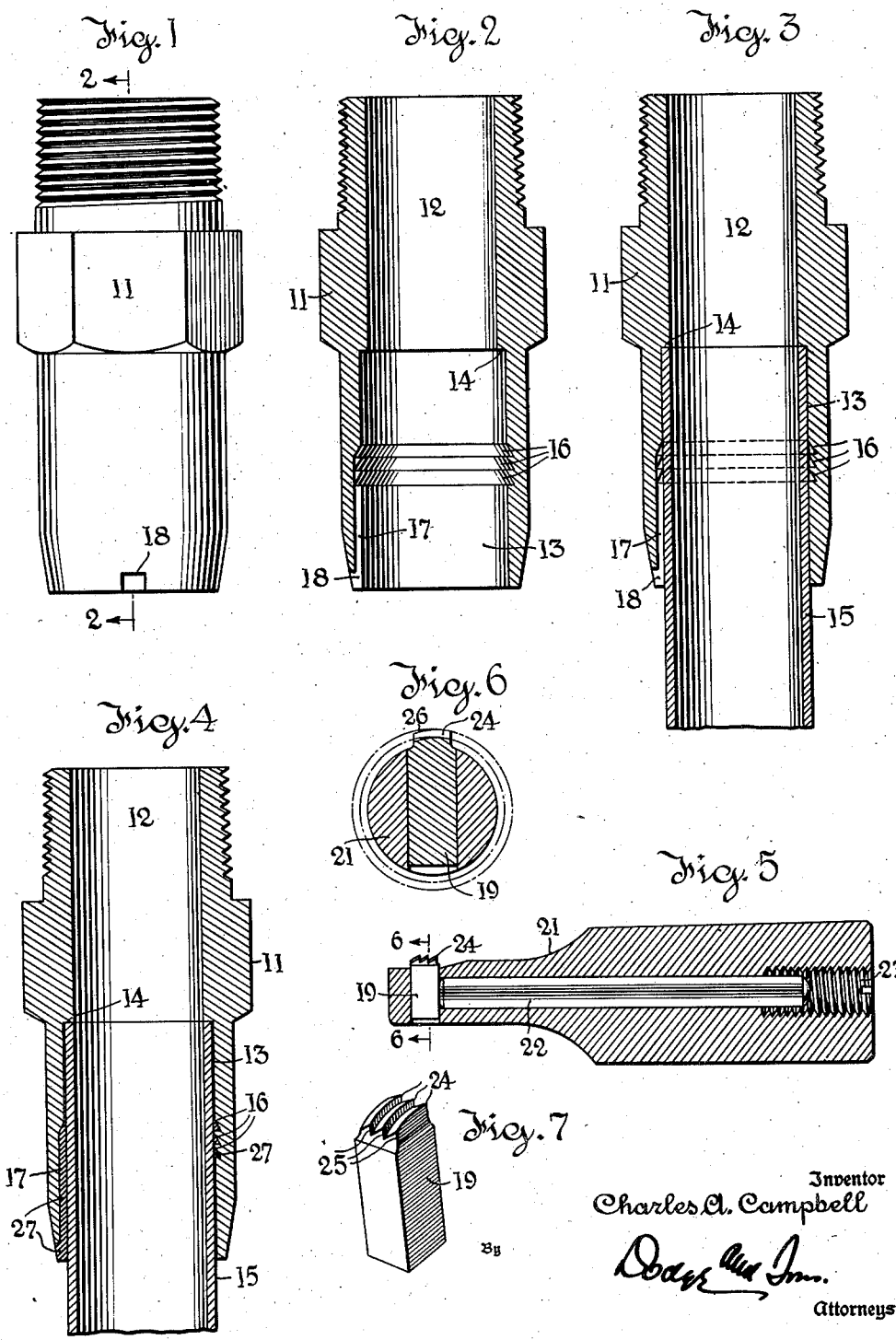

Patented Sept. 21, 1937

2,093,513

UNITED STATES PATENT OFFICE 2,093,513

METHOD OF GROOVING PIPE FITTINGS AND THE LIKE

Charles A. Campbell, Watertown, N. Y., assignor to The New York Air Brake Company, a corporation of New Jersey Application January 16, 1936, Serial No. 59,450

4 Claims. (Cl. 29—157)

This invention relates to sweated joints, and particularly to sweated joints formed between a rod or tube and an encircling sleeve.

It has long been known that if the clearance or interval between the two elements to be sweated together be of capillary thickness, and if the two elements be fluxed before assembly and properly heated, molten solder will enter the capillary interval by capillary attraction and distribute itself throughout the entire capillary interval, that is in the case of a sleeve joint, throughout the area between the opposed surfaces of the rod or tube on the one hand and the encircling sleeve on the other.

In Patent 1,770,852, Hill proposes the use of what he calls an exterior opening leading through the wall of the fitting and preferably communicating with a groove which encircles the capillary zone intermediate the ends thereof. The patent states that the use of the groove is desirable but is not essential to the formation of a satisfactory joint.

Manufacture of fittings with an internal groove and radially drilled ports is needlessly expensive, and one purpose of the present invention is to simplify the manufacture of fittings for sweated joints and at the same time improve the character of the joint produced. The invention provides for cutting the annular internal groove and cutting a sprue or feed port leading thereto along the joint itself by two successive operations performed by a single tool of novel form. According to the preferred practice the fitting is mounted in a chuck to turn on its axis, and while being rotated is provided with saw tooth annular grooves by the action of a cutter or bit carried in a boring bar or the equivalent, and fed radially outward to the cut.

While the number of grooves is subject to variation, and the use of a single groove is within the purview of the invention, satisfactory results have been secured by the use of three small grooves, as shown in the drawing.

After the tool or bit has been fed outward to cut the groove or grooves to the full desired depth, the rotation of the chuck is stopped and the boring tool is withdrawn in the direction of the axis of the fitting. At such time the saw-toothed cutter or bit acts as a broach and cuts a longitudinal groove connecting the annular grooves with one end of the fitting. In this way the grooves and a communicating sprue are formed expeditiously and cheaply.

The operation can be carried out in various types of machine tools capable of producing relative rotation of the fitting with respect to the tool while the tool is fed radially, and axial travel of the tool when the fitting is at rest. While the operation can be carried out in an ordinary lathe, simple automatic machines can readily be developed to carry out the operations in the desired sequence.

Tests have shown remarkably satisfactory results with reference to the joint produced by the use of such fittings.

The invention will now be described in connection with the accompanying drawing, in which,—

Fig. 1 is a side elevation of a threaded nipple with sleeve according to the invention.

Fig. 2 is a section on the line 2—2 of Fig. 1.

Fig. 3 is a view similar to Fig. 2 but showing the tube inserted.

Fig. 4 is a view similar to Fig. 3 after capillary flow of solder.

Fig. 5 is an axial section of the cutter bar with the bit or cutter in place.

Fig. 6 is a transverse section on the line 6—6 of Fig. 5, drawn on an enlarged scale.

Fig. 7 is a perspective view of the cutter or bit.

The invention is applicable to all types of fittings including T's, elbows, U's, and in fact any soldered sleeve joint between a tube end or rod end and a socketed member. Hence the embodiment illustrated is exemplary.

The fitting 11 having port or passage 12 is counterbored at 13 to form shoulder 14. The counterbore 13 is such as to receive the end of an element 15, shown as a tube, though so far as the invention is concerned it might be a rod. The clearance between the element 15 and the encircling counterbore is dimensioned to ensure the desired capillary flow.

Before element 15 is inserted one or more circumferential grooves 16 are cut within the counterbore preferably by rotating the fitting and feeding the tool (hereinafter described) radially outward. This, broadly considered, is a turning operation.

Then rotation is stopped and without withdrawing the tool from the cut the tool is withdrawn in a direction parallel with the axis of the counterbore 13, broaching a groove 17 which communicates with the groove or grooves 16. A notch 18 may be cut at the end of groove 17 but this is not essential.

The tool used is preferably but not necessarily a removable bit 19 mounted and transversely adjustable in a stock or boring bar 21. Clamping is effected by a rod 22 axially slidable in stock 21 and set by a threaded plug 23.

The bit 19 has cutting teeth 24, one for each groove 16, and these are preferably of the buttressed or saw tooth type and preferably not undercut on the faces 25. They are backed off as indicated at 26 (Fig. 6) to afford clearance behind the cutting edge during turning.

After turning is completed the tool is withdrawn in a direction parallel with the axis of counterbore 13 and the teeth 24 execute a scraping or broaching cut which forms the groove 17.

To solder the joint the counterbore 13 and the end of element 15 are fluxed. While the end of element 15 is inserted in counterbore 13 and while the parts are suitably heated, solder is fed to the outer end of groove 17. Even with the parts in the position of Fig. 3 the solder will flow up groove 17 and around grooves 16 and will enter the entire capillary interval between element 15 and counterbore 13.

The solder is indicated at 27 in Fig. 4. To indicate the extent of the capillary film of solder, this has been exaggerated in thickness, since the film cannot be illustrated on the true scale of the drawing.

What is claimed is,—

1. The method of grooving a cylindrical component to be used in forming sweated pipe or rod joints which comprises causing a cutter to cut at least one annular groove around the component, by relative rotation and radial feed between the component and cutter; and then at the completion of said feed causing relative motion between the cutter and component in the direction of the axis of the component whereby a sprue groove communicating with the annular groove is formed.

2. The method of grooving a cylindrical component to be used in forming sweated pipe or rod joints, which comprises forming at least one circumferential groove and a communicating longitudinal groove by two grooving operations successively performed by a toothed forming tool, one of said operations being a broaching operation and the other a turning operation in which respectively the paths of the work relatively to the tool are at approximately 90° to one another.

3. The method of grooving a cylindrical component to be used for sweated pipe or rod joints, which comprises turning a circumferential groove in said component by feeding a toothed forming tool to the cut and then without retracting said forming tool from the groove, traversing the forming tool to broach a groove communicating with the turned groove and adapted to serve as a sprue.

4. The method of grooving a cylindrical component to be used in forming sweated pipe or rod joints, which comprises turning multiple grooves by feeding to the work a forming cutter having buttress teeth, then without retracting the cutter from the groove so formed, traversing the cutter in the direction of the axis of said component whereby the buttress teeth of the cutter broach a groove connecting with the turned grooves and adapted to serve as a sprue.

CHARLES A. CAMPBELL.